United States Patent
Sargeant

[11] Patent Number: 5,819,400
[45] Date of Patent: Oct. 13, 1998

[54] METHOD OF MANUFACTURING AN ELECTRODE ASSEMBLY FOR ELECTROCHEMICALLY ETCHING RIFLING IN GUN BARRELS

[75] Inventor: David R. Sargeant, Ellington, Conn.

[73] Assignee: Smith & Wesson Corp., Springfield, Mass.

[21] Appl. No.: 669,907

[22] Filed: Jun. 25, 1996

[51] Int. Cl.$^6$ ................................................. H01R 43/00
[52] U.S. Cl. ........................ 29/825; 204/212; 204/224 M
[58] Field of Search ............................... 29/825; 204/212, 204/224 M

[56] References Cited

U.S. PATENT DOCUMENTS

| | | | |
|---|---|---|---|
| 2,848,401 | 8/1958 | Hartley . | |
| 3,467,593 | 9/1969 | Dickson et al. | 204/224 M |
| 3,769,194 | 10/1973 | Haggerty | 209/212 |
| 3,788,964 | 1/1974 | Kurz et al. | 204/224 M |
| 4,690,737 | 9/1987 | Vishnitsky | 204/129.7 |
| 4,710,280 | 12/1987 | Brilmyer et al. | 204/146 |
| 4,772,367 | 9/1988 | Menzel et al. | 204/129.7 |
| 5,004,529 | 4/1991 | Vishnitsky | 204/212 |

Primary Examiner—Carl J. Arbes
Attorney, Agent, or Firm—McCormick, Paulding & Huber

[57] ABSTRACT

An electrode assembly for electrochemically etching the rifling of a gun barrel and method of manufacturing the electrode assembly is disclosed. The electrode assembly includes a unitary cage formed of insulative material, such as a thermoplastic polymer like Nylon, disposed about an electrically conductive core member. The core member includes a generally cylindrical body portion that has an outer generally cylindrical surface with a plurality of helical grooves disposed the length of the body portion, and a threaded member that coaxially extends from one end of the body portion for connecting to a rifling rod. The grooves have a generally dovetail cross-section and at least one radially extending recess disposed therein. The unitary cage has a strip portion disposed within each helical groove and end portions disposed at each longitudinal end of the body portion of the core member. The electrode assembly is formed by injection molding the polymeric material about the body portion of the core member and into the grooves. The polymeric material is turned and milled away to expose the outer cylindrical surface of the core member to form the unitary cage.

11 Claims, 2 Drawing Sheets

METHOD OF MANUFACTURING AN ELECTRODE ASSEMBLY FOR ELECTROCHEMICALLY ETCHING RIFLING IN GUN BARRELS

FIELD OF THE INVENTION

This invention relates to electrochemical etching and, more particularly, to an electrode assembly for electrochemically rifling and milling in gun barrels.

BACKGROUND OF THE INVENTION

Electrochemically etching of rifling is a well known process in which metal is removed from the inner cylindrical surface of a gun barrel or the like to form circum-ferentially spaced helical grooves by electrochemical action. In the process, a current flow is passed from the barrel through an electrolytic fluid to a rifling electrode assembly coaxially mounted in the barrel and causes material from the inner surface of the barrel to be selectively removed.

In the prior art, the current flow is generated by a rectifier with the positive terminal connected to the barrel (anode) and the negative terminal electrically connected to the electrode assembly (cathode) disposed at one end of a rifling rod. The rifling electrode assembly includes a conductive metallic core having a generally cylindrical body portion. A plurality of radially-spaced strips of non-conductive material project helically along the peripheral surface of the cylindrical body portion. The insulator strips are adapted to engage the inner surface of the barrel to form a plurality of helical channels for passing the electrolytic fluid at high velocity through the barrel. The inner cylindrical surface of the barrel exposed to the conductive portion of the electrode assembly is electrochemically dissolved or removed by anodic action, that is, by current flow from the surface of the barrel through the electrolyte to the rifling electrode assembly. The form and size of the uninsulated areas of the electrode assembly directly correspond to the form and size of the helical rifling grooves to be etched in the barrel. The form and size of the insulator strips of the head member correspond directly to the form and size of the lands of the barrel extending between the rifling grooves. The amount of material removed depends primarily on current density and the process cycle time. The electrochemical action attacks only the anode or inner barrel surface.

U.S. Pat. No. 4,690,737 discloses an electrochemical rifling process for gun barrels, as described above. The electrode assembly used in the process comprises a cylindrical metallic body, preferably made from brass or copper, having a plurality of circumferentially-spaced, generally rectangular spiral grooves disposed in its outer peripheral surface. The insulator strips of plastic or the like are mounted in the grooves. The outer diameter of the insulator strips is substantially equal to the inner diameter of the barrel for insulating the contiguous inner surface of the barrel from the electrolyte fluid during the electrochemical etching operation. The leading and trailing ends of the electrode assembly are provided with tapered frusto-conically shaped surfaces to assure laminar flow of the electrolyte fluid through the space between the electrode assembly and the barrel. These frusto-conical surfaces are provided by a pair of discrete end caps secured to the ends of the cylindrical body portion of the electrode assembly.

One commercially manufactured electrode assembly has discrete insulator strips secured within the rectangular grooves of the body portion of the electrode assembly, and end caps secured to the ends of the body portion by an adhesive. It has been found that the strips have a tendency, over time, of separating or disengaging from the body portion resulting in catastrophic failures to the electrode assembly and the barrel. Because each insulator strip is individually secured in its respective groove by an adhesive, assembly of the head portion or replacement of the insulator strips is labor intensive and therefore, quite costly.

Furthermore, the commercially available electrode assembly has insulator strips formed of a polytetrafluoroethylene (TEFLON) based polymer. The characteristics of TEFLON require the insulator strips to be turned or machined to very precise tolerances which further increase manufacturing costs. TEFLON, a relatively soft material which results in deterioration of concentricity of the electrode assembly over a relatively short period of time, resulting in loss of concentricity of the rifling of the barrel.

During the etching process, the electrode assembly must also be longitudinally drawn through the gun barrel at relatively low speeds due to its lack of structural rigidity. The lack of structural rigidity is a result of the construction of adhering individual strips and end caps to form the electrode assembly and the use of soft polymeric material, such as TEFLON.

Accordingly, it is the general object of the present invention to provide an electrode assembly for electro-chemically etching the rifling in a gun barrel to overcome the disadvantages of the prior art.

It is another object to provide an electrode assembly of greater integrity and reliability to reduce the likelihood of catastrophic failure.

It is a further object to provide an electrode assembly with improved concentricity characteristics over a greater period of use.

It is yet another object to provide an electrode assembly of grater structural rigidity to enable increased draw rate of the electrode assembly through the gun barrel for reducing the cycle time of the etching process.

It is still another object to provide an electrode assembly that is less costly to manufacture.

SUMMARY OF THE INVENTION

According to the present invention, an electrode assembly adapted for electrochemically etching the rifling in a gun barrel comprises a unitary cage formed of an insulative material disposed about an electrically conductive core member. The core member includes a generally cylindrical body portion having an outer generally cylindrical surface with at least one longitudinally extending helical groove disposed therein. The unitary cage has at least one positioning strip disposed within the helical groove and end portions disposed at each longitudinal end of the body portion of the core member. The positioning strip radially projects from the helical groove beyond the outer cylindrical surface of the body portion of the core member by a predetermined distance for providing an outer diameter of the electrode assembly approximately equal to the inner diameter of the barrel.

In another aspect of the present invention, an electrode assembly comprises an electrically conductive core member and at least one positioning strip formed of insulative material. The core member includes a generally cylindrical body portion having an outer generally cylindrical surface with at least one helical groove disposed therein. The groove has a generally dovetail cross-section. The strip is disposed within the helical groove and projects radially from the helical groove beyond the outer cylindrical surface of the body portion of the core member by a predetermined distance for providing an outer diameter of the electrode assembly equal to the inner diameter of the barrel.

In another aspect of the present invention, a method of manufacturing an electrode assembly comprises the steps of forming an electrically conductive core member, including a generally cylindrical body portion having an outer generally cylindrical surface with at least one groove disposed therein. An insulative polymeric material is injection-molded about the body portion of the core member and into at least one groove. The molded polymeric material has integral end portions extending axially beyond the ends of the cylindrical body portion. A portion of the molded polymeric material is removed for exposing the outer cylindrical surface of the conductive core member along a helical path in non-overlying relationship with the groove.

The above and other objects and advantages of this invention will become more readily apparent when the following description is read in conjunction with the accompanying drawings.

DETAILED DESCRIPTION OF THE PREFERRED EMBODIMENTS

Figure 1:
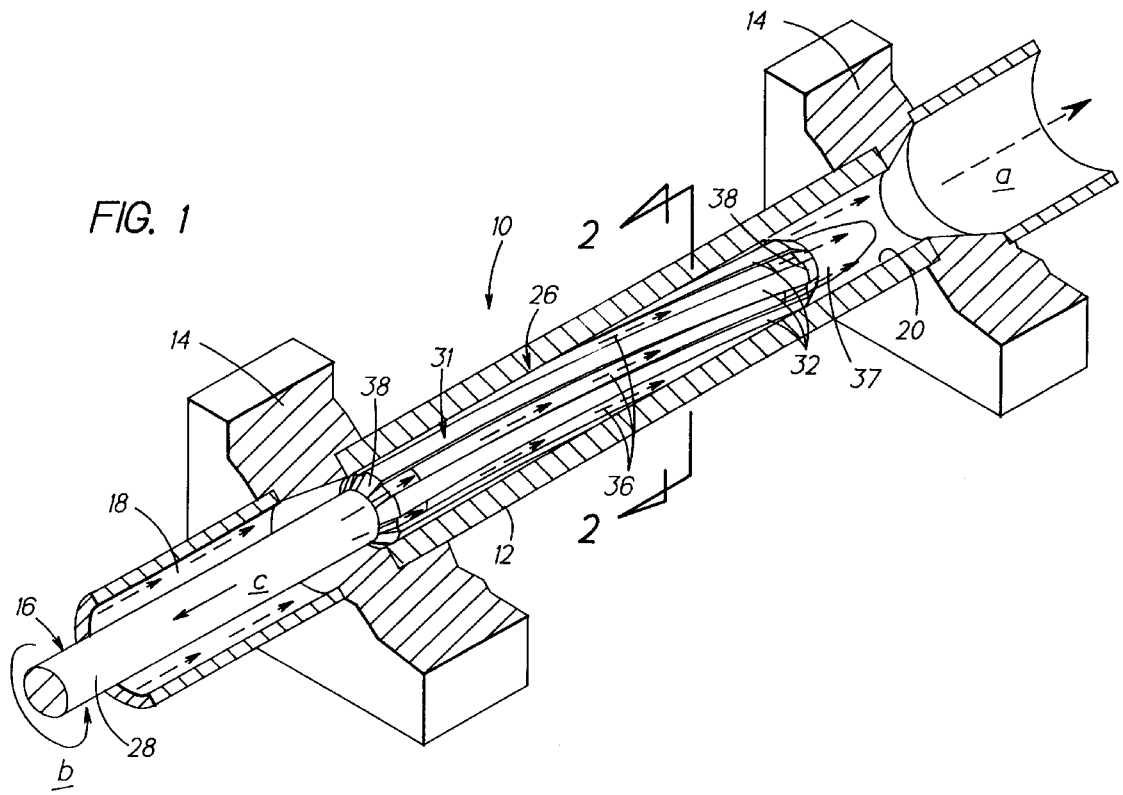
FIG. 1 is a perspective view in partial section of a preferred embodiment of an apparatus for electrochemically etching of rifling in gun barrels in accordance with the present invention.

Referring to FIG. 1, the preferred embodiment of an apparatus for electrochemically etching the rifling in a gun barrel 12 is generally designated by the reference numeral 10.

Figure 2:
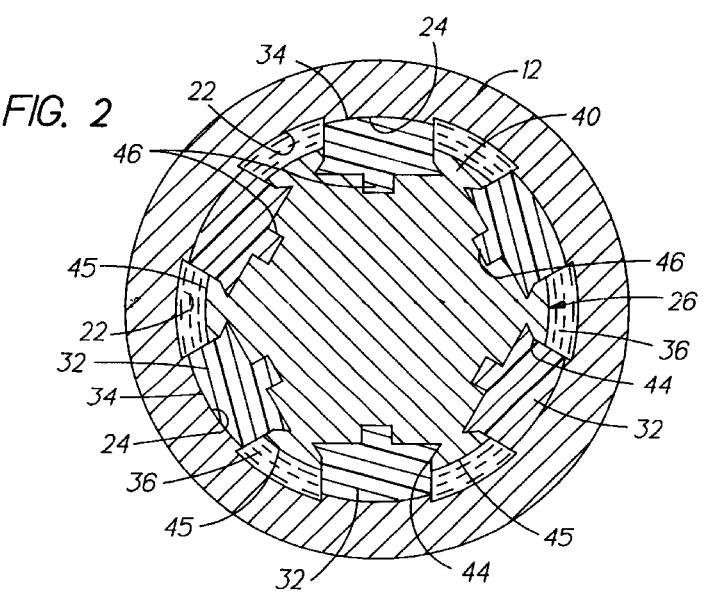
FIG. 2 is a cross-sectional view of the preferred embodiment of the electrode assembly and barrel taken along the line 2—2 in FIG. 1.
Figure 6:
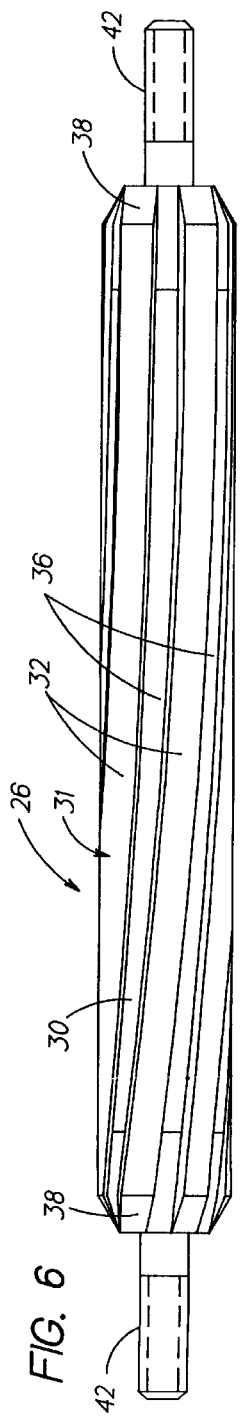
FIG. 6 is a side elevational view of the electrode assembly of FIG. 5 at the next step of the process of manufacturing the electrode assembly.

Generally, the gun barrel 12 is mounted within a support 14 and a rifling rod assembly 16 is mounted to be coaxially aligned with the barrel for movement through the barrel. As best shown in FIGS. 1, 2 and 6, the preferred embodiment of the rifling rod assembly 16 includes an electrode assembly 26 coaxially attached to one end of a rod portion 28. The electrode assembly 26 comprises a core member 30 having a generally cylindrical body portion 40 formed of electrically conductive material, such as brass and copper, and a unitary cage 31 formed of insulative material, such as thermoplastic polymer like Nylon, molded to the body portion to form end portions 38 and a plurality of insulative strips 32 helically disposed about the core member. The unitary cage 31 is preferably formed by injection molding polymeric material about the body portion 40 of the core member 30 and then selectively machining or milling the polymeric material away to form the insulative strips 32 and the end portions 38, to be described in greater detail hereinafter.

As shown in FIG. 2, the outer diameter of the electrode assembly 26, defined by the peripheral surfaces 34 of the insulative strips 32, is approximately equal to the inner diameter of the gun barrel 12 to thereby position coaxially the electrode assembly in the barrel. When the electrode assembly 26 is fitted within the barrel 12, the peripheral surface 34 of the strips 32 engage the inner surface 20 of the barrel to provide a plurality of helical channels 36 defined by the body portion 40 of the core member 30 and the insulative strips of the electrode assembly.

A pump (not shown) pumps an electrolyte 18 over the electrode assembly 26 and through the barrel 12 in the direction of arrow a at a controlled pressure and velocity. The end portions 38 may be frusto-conical in shape to enhance the laminar flow of the electrolyte 18 over the electrode assembly 26 through the channels 36. A tapered end cap 37 may be attached to one end of the electrode assembly 26 to further enhance the laminar flow of the electrolyte 18. A drive mechanism (not shown) rotates the electrode assembly 26 disposed within the barrel 12 in a counterclockwise direction (arrow b) as the electrode assembly is drawn at a predetermine rate through the barrel in the direction of arrow c. The rates of rotation and drawing movement of the electrode assembly 26 are set to match the pitch of the insulative strips 32 to the rifling to be generated in the bore of the barrel 12.

As the electrode assembly 26 passes through the barrel 12, a d.c. power source (not shown), having its positive terminal connected to the barrel (anode) and its negative terminal connected to the electrode assembly (cathode), generates a direct current flow from the barrel through the electrolyte 18 to the electrode assembly. Through cationic action, material from the inner surface 20 of the barrel 12 is removed creating a plurality of grooves 22 and lands 24, as shown in FIG. 2. The width of the grooves 22 are equal to the width of the radial space between the strips 32 of the electrode assembly 26, and the width of the lands 24 are defined by the width of the strips. The depth of the grooves of the barrel is dependent upon the current density and the cycle time of the electrode assembly be drawn through the barrel.

Figure 3:
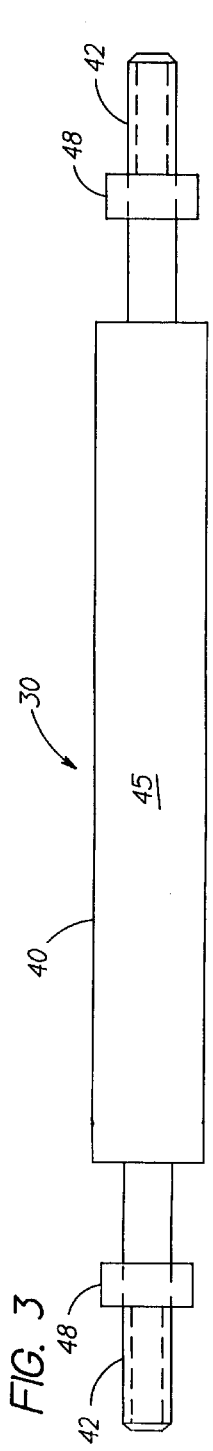
FIG. 3 is a side elevational view of the conductive core portion of the electrode assembly of FIG. 1 at one step in the manufacture of the electrode.
Figure 4:
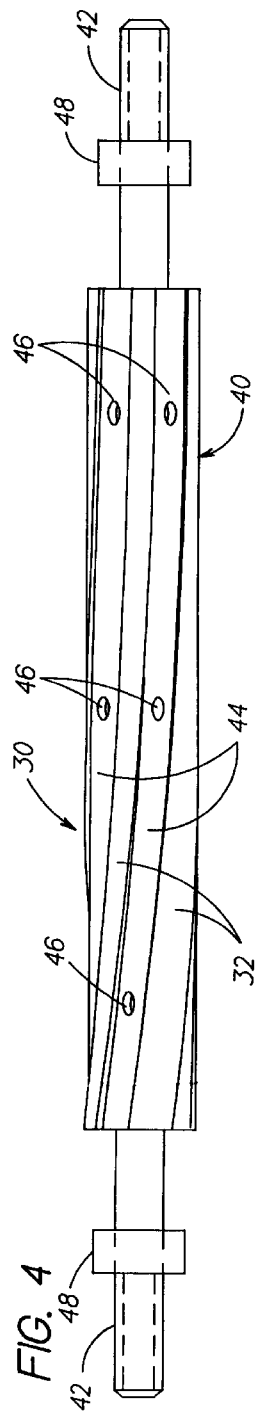
FIG. 4 is a side elevational view of the conductive core portion of the electrode assembly of FIG. 3 at the next step in the manufacture of the electrode assembly.

Referring to FIGS. 3 and 4, the core member 30 includes a preferably cylindrical body portion 40 and threaded members 42 extending coaxially from the ends of the body portion. The threaded members 42 provide means for connecting one end of the electrode assembly 26 to the rod portion 28 and for attaching the tapered end cap 37 at the other end of the electrode assembly.

As shown in FIGS. 2 and 4, the body portion 40 of the core member 30 has a plurality of helical grooves or flutes 44 which extend longitudinally about its outer generally cylindrical surface 45 for securing the unitary cage 31 to the core member. The grooves 44 have a preferably dovetail cross-section which provide mechanical support for the insulative strips 32 injection-molded therein to prevent radial disengagement of the strip from the core member. Disposed along the bottom surface of the grooves 44 are a plurality of radially extending recesses 46 which act as an additional means to mechanically anchor the strips 32 to prevent the strips from sliding longitudinally out from the body portion 40 of the core member 30. The dovetail grooves and recesses disposed therein eliminate the need for an adhesive to securely retail the strips in the core member. The end portions 38 also provide additional support to the strips 32 by securing their ends to the threaded members 42 of the core member 30.

The polymer strips 32 and end portions 38 are preferably formed of a thermoplastic polymer material, such as Nylon. Nylon based polymer has better wear and memory characteristics than the TEFLON-based polymer used in a commercially available electrode assembly. Nylon, unlike TEFLON, absorbs moisture causing minute swelling or expansion of the strips which compensates for wear to the peripheral surface 34 of the strip 32 and thereby providing better concentricity over the life of the electrode assembly 26. The swelling of the Nylon also reduces the need to mill the outer diameter d of the strip portions 32 to a tight tolerance, resulting in lower costs to manufacture the electrode assembly 26. For example, the tolerance of the outer diameter of a commercially available electrode assembly is typically ±0.0005 inches, while the tolerance of the outer diameter of the present invention is approximately ±0.001 inches.

As discussed earlier, the insulative strip 32 and end portions 38 are secured to the core member 30 of the electrode assembly 26 by injection-molding. FIGS. 3–6 illustrate the steps to manufacture the electrode assembly. Referring to FIG. 3, the core member 30 is turned or formed to include a collar 48, 48 disposed about each of the dependent members 42, 42 extending axially from the cylindrical body portion 40. The collars 48, 48 are used to properly locate the core member 30 within the mold during the injection molding process. The ends of the dependent members 42 are then threaded to provide attachment means for the rod 28 and tapered end cap 37.

As illustrated in FIG. 4, the cylindrical body portion 40 of the core member 30 is then turned and machined to form a predetermined number of helical dovetail grooves 44 at a predetermined pitch and recesses 46 disposed within the grooves.

Figure 5:
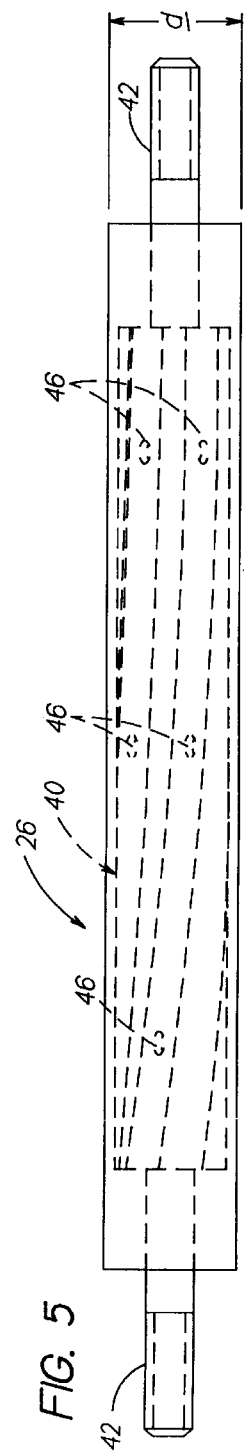
FIG. 5 is a side elevational view of the conductive core portion of the electrode assembly of FIG. 4 at the next step in the manufacture of the electrode assembly.

Referring to FIG. 5, the core member 30 is located in the mold and the polymeric material is then injection-molded about the body portion of the core member and a portion of the threaded members 42. The polymeric material is generally cylindrical having an outer diameter greater than the diameter of the inner diameter of the barrel 12. The collars 48, 48 are then removed from the threaded members 42 by turning or grinding. The outer diameter d of the polymeric material is turned to a diameter approximately equal to the inner diameter of the barrel 12.

Referring to FIG. 6, the next step is to mill or machine the helical channels 36 in the polymeric material to define the insulative strips 32. The polymeric material is removed to expose the outer cylindrical surface 45 of the metallic core member 30 disposed between the edges of each of the helical grooves 44 of the body portion 40 of the core member. The helical channels 36 extend through the end portions 38 to allow electrolyte 18 to pass through the channels 36. The ends of the polymeric material may then be turned to form the frusto-conical end portions 38.

An advantage of the electrode assembly 26 of the present invention is that the increased rigidity provided by the injection molded unitary cage construction of the electrode assembly and the use of a relatively hard polymer material for the unitary cage 31 enables the electrode assembly to be drawn through the gun barrel 12 at a much higher rate, thus reducing the cycle time of the etching process.

The preferred embodiment of the electrode assembly 26 is shown to have six equally-spaced insulative strips 32 of predetermined width and pitch. One skilled in the art, however, would recognize that the number of strips and their dimensions and spacing may be varied depending upon the requirements of the rifling of the gun barrel 12 without departing from the teachings of the invention.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described my invention, what is claimed is:

1. A method for manufacturing an electrode assembly for electrochemical etching the rifling in a gun barrel comprising the steps of:
    (a) forming an electrically conductive core member including a generally cylindrical body portion having an outer generally cylindrical surface with at least one groove disposed therein;
    (b) injection molding an insulative polymeric material about said body portion of said core member and into said at least one groove, the molded polymeric material having integral end portions extending axially beyond the ends of said cylindrical body portion;
    (c) removing a portion of the molded polymeric material for exposing said outer cylindrical surface of said conductive core member along a helical path in non-overlaying relationship with the groove.

2. A method of manufacturing an electrode assembly, as set forth in claim 1, further comprising the step of:
    forming a core member having at least one depending member projecting coaxially from an end of said body portion for connecting said electrode assembly to a conductive rod.

3. A method of manufacturing an electrode assembly, as set forth in claim 1, wherein:
    the step of forming includes forming the groove having a generally dovetail cross-section.

4. A method of manufacturing an electrode assembly, as set forth in claim 1, wherein:
    the step of removing includes removing a plurality of portions of the molded polymeric material for exposing the outer cylindrical surface of the conductive core member along helical paths in non-overlying relationship with the groove.

5. A method of manufacturing an electrode assembly, as set forth in claim 1, wherein:
    the step of forming includes forming the core with a generally cylindrical body portion having a plurality of helical grooves disposed in the outer cylindrical surface; and
    the step of removing includes removing the molded polymeric material along a plurality of helical paths in non-overlapping relationship with the grooves to expose the cylindrical surface.

6. A method of manufacturing an electrode assembly, as set forth in claim 1, wherein the grooves are formed with dove-tail cross-section.

7. A method of manufacturing an electrode assembly, as set forth in claim 1, further including the step of forming the molded polymeric material with an outer diameter substantially equal to the inner diameter of a gun barrel.

8. A method of manufacturing an electrode assembly, as set forth in claim 1, further comprising the step of threading the projecting member of the core member.

9. A method of manufacturing an electrode assembly, as set forth in claim 1, further comprising the steps of:

forming a collar about said projecting member for properly locating said core member during the injection molding step; and removing said collar after the step of molding.

10. A method of manufacturing an electrode assembly, as set forth in claim 1, further comprising the step of providing the integral end portions with a frusto-conical shape.

11. A method of manufacturing an electrode assembly, as set forth in claim 1, further comprising the step of providing at least one recess in the groove of the core member prior to the step of molding for further anchoring said molded polymeric material to said core member.

* * * * *